United States Patent
Komano et al.

(10) Patent No.: US 8,766,661 B2
(45) Date of Patent: Jul. 1, 2014

(54) MALFUNCTION DETECTING DEVICE FOR SOLAR CELL PANEL

(75) Inventors: Haruyasu Komano, Hitachi (JP); Kazuo Kotani, Hitachi (JP); Naofumi Chiwata, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 223 days.

(21) Appl. No.: 13/468,230

(22) Filed: May 10, 2012

(65) Prior Publication Data

US 2012/0286961 A1    Nov. 15, 2012

(30) Foreign Application Priority Data

May 11, 2011    (JP) ................................. 2011-106556

(51) Int. Cl.
  *G01R 31/26*    (2014.01)
(52) U.S. Cl.
  USPC ................. 324/761.01; 324/750.01; 324/551; 320/107; 307/112; 307/113
(58) Field of Classification Search
  USPC ................. 324/537, 761.01, 71, 750.01, 551; 320/107; 307/112, 113
  See application file for complete search history.

(56) References Cited

U.S. PATENT DOCUMENTS

| | | | |
|---|---|---|---|
| 6,515,215 B1 | 2/2003 | Mimura | |
| 6,812,396 B2 * | 11/2004 | Makita et al. | 136/244 |
| 6,979,771 B2 | 12/2005 | Mimura | |
| 7,161,082 B2 * | 1/2007 | Matsushita et al. | 136/244 |
| 2003/0062078 A1 | 4/2003 | Mimura | |
| 2011/0068817 A1 * | 3/2011 | Hashimoto et al. | 324/761.01 |
| 2012/0049879 A1 * | 3/2012 | Crites | 324/761.01 |
| 2013/0009662 A1 * | 1/2013 | Komano et al. | 324/761.01 |

FOREIGN PATENT DOCUMENTS

| | | |
|---|---|---|
| EP | 1 691 246 A2 | 8/2006 |
| JP | 11-330521 A | 11/1999 |
| JP | 2006-201827 A | 8/2006 |

* cited by examiner

*Primary Examiner* — Huy Q Phan
*Assistant Examiner* — Adam Clarke
(74) *Attorney, Agent, or Firm* — Foley & Lardner LLP (57) ABSTRACT

A malfunction detecting device for a solar cell panel includes an AC source that is provided on one of positive and negative sides of a solar cell panel body and can apply AC voltage superimposed on DC voltage to the solar cell panel, a measuring means provided on another of the positive and negative sides of the solar cell panel body to measure voltage or current output from the solar cell panel, and a control unit including a malfunction determination portion that controls the AC source to control input voltage or input current to be input to the solar cell panel and determines malfunction in the solar cell panel by comparing the input voltage or the input current to output voltage or output current measured by the measuring means. The malfunction determination portion includes a panel body malfunction determination portion and a bypass diode malfunction determination portion.

5 Claims, 7 Drawing Sheets

MALFUNCTION DETECTING DEVICE FOR SOLAR CELL PANEL

The present application is based on Japanese patent application No. 2011-106556 filed on May 11, 2011, the entire contents of which are incorporated herein by reference.

BACKGROUND OF THE INVENTION

1. Field of the Invention

The invention relates to a malfunction detecting device for a solar cell panel that detects a malfunction, such as a failure, etc., in the solar cell panel.

2. Description of the Related Art

A conventional solar cell panel malfunction detecting device is known that detects a malfunction, such as a failure, etc., in a solar cell panel based on characteristics of DC current-voltage output from the solar cell panel (see, e.g., JP-A-2006-201827).

Figure 8A:
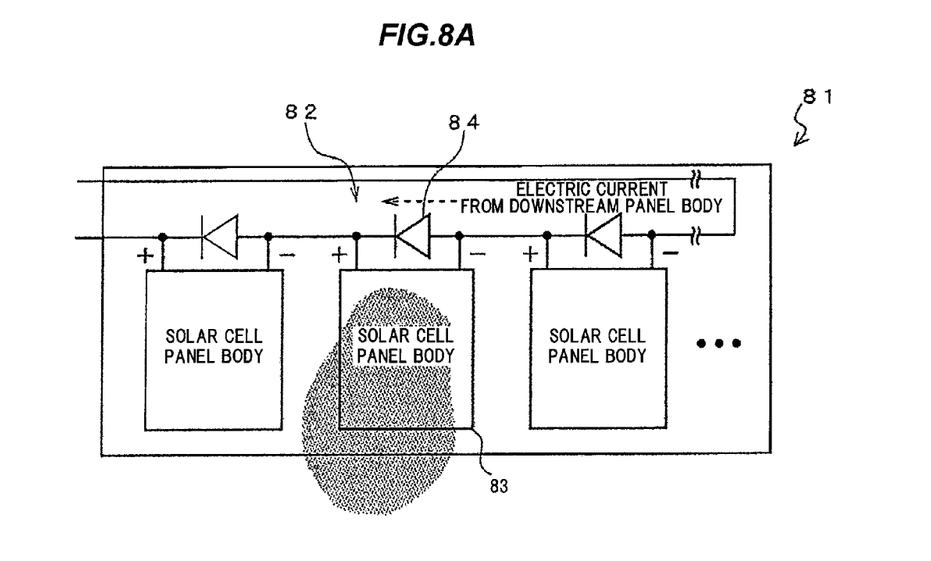
FIGS. 8A and 8B are explanatory diagrams illustrating a problem when a bypass diode breaks down.

As shown in FIG. 8A, in a solar cell power generation system, a solar cell module 81 is generally formed by connecting plural solar cell panels 82 in series. A bypass diode 84 is each provided between positive and negative terminals extending from an edge of a solar cell panel body 83 of each solar cell panel 82 (see, e.g., JP-A-11-330521).

A case where output of, e.g., the second solar cell panel body 83 from the left in the drawing is reduced due to shadow, etc., thereon is examined here. When output of a solar cell panel body 83 is reduced, this solar cell panel body 83 with reduced output becomes a resistive element of a downstream solar cell panel 82 (on the right side in the drawing). Therefore, the electric current from the downstream solar cell panel 82 bypasses the solar cell panel body 83 with reduced output and flows in the bypass diode 84 with a resistance of substantially zero as indicated by a dashed arrow in the drawing. Thus, the bypass diode 84 serves to bypass electric current from the downstream solar cell panel 82.

SUMMARY OF THE INVENTION

Figure 8B:
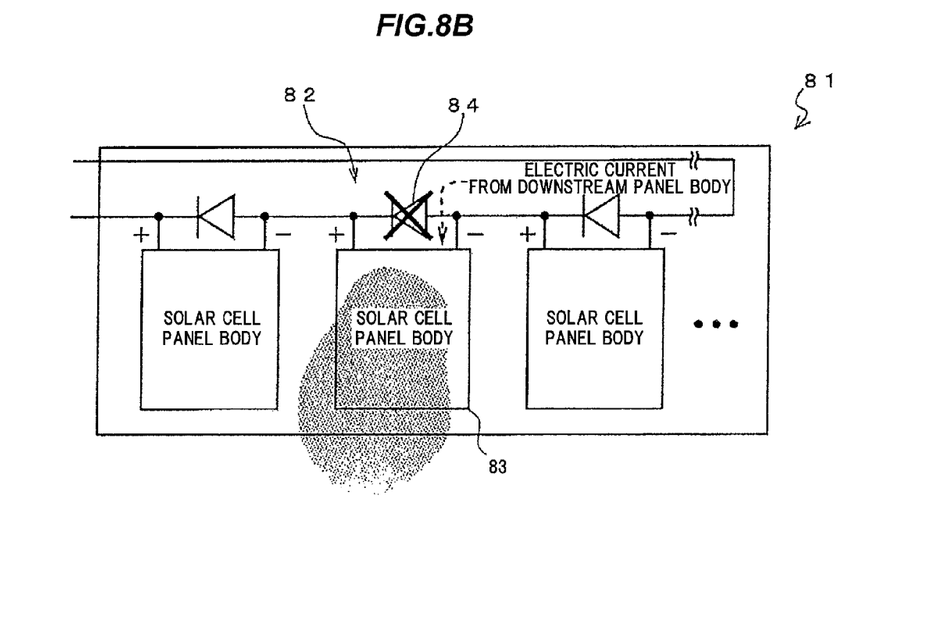

However, when a bypass diode 84 corresponding to the solar cell panel body 83 with reduced output fails and is opened as shown in FIG. 8B, all current from the downstream solar cell panel 82 flows into the solar cell panel body 83 as indicated by a dashed arrow in the drawing. Since the solar cell panel body 83 with reduced output is a resistive element as described above, the solar cell panel body 83 generates heat due to the current flowing therein. As a result, the solar cell panel body 83 may be damaged by overheat or the overheated solar cell panel body 83 as a heat source may cause fire.

In order to avoid such problems, it is necessary to detect not only malfunction in a solar cell panel body but also malfunction in a bypass diode when detecting malfunction in a solar cell panel.

However, the solar cell panel malfunction detecting device described in JP-A-2006-201827 has a problem that it is not possible to detect malfunction in a bypass diode.

A possible method of detecting malfunction in a bypass diode is to check a presence of failure in a bypass diode by, e.g., regular inspection using a tester, etc., however, there is a problem that it is very troublesome.

Accordingly, it is an object of the invention to provide a malfunction detecting device for a solar cell panel that can easily detect a malfunction in a bypass diode as well as a malfunction in a solar cell panel body.

(1) According to one embodiment of the invention, a malfunction detecting device for a solar cell panel for detecting a malfunction in the solar cell panel, the solar cell panel comprising a solar cell panel body and a bypass diode having a cathode electrically connected to a positive terminal of the solar cell panel body and an anode electrically connected to a negative terminal of the solar cell panel body, the device comprises:

an AC source that is provided on one of positive and negative sides of the solar cell panel body and can apply AC voltage superimposed on DC voltage to the solar cell panel;

a measuring means provided on another of the positive and negative sides of the solar cell panel body to measure voltage or current output from the solar cell panel; and a control unit comprising a malfunction determination portion that controls the AC source to control input voltage or input current to be input to the solar cell panel and determines malfunction in the solar cell panel by comparing the input voltage or the input current to output voltage or output current measured by the measuring means, wherein the malfunction determination portion comprises:

a panel body malfunction determination portion controlling the AC source to reverse-bias the bypass diode and determining malfunction in the solar cell panel body on the basis of input voltage or input current at that time and output voltage or output current measured by the measuring means; and a bypass diode malfunction determination portion controlling the AC source to forward-bias the bypass diode and determining malfunction in the bypass diode on the basis of input voltage or input current at that time and output voltage or output current measured by the measuring means.

In the above embodiment (1) of the invention, the following modifications and changes can be made.

(i) The measuring means comprises a voltage measuring means provided on the other of the positive and negative sides of the solar cell panel body to measure voltage output from the solar cell panel, wherein the malfunction determination portion is configured to control the AC source to control input voltage to be applied to the solar cell panel and to determine malfunction in the solar cell panel on the basis of a ratio of output voltage measured by the voltage measuring means to the input voltage, wherein the panel body malfunction determination portion is configured to control the AC source to control magnitude of DC voltage to be superimposed on AC voltage and then to apply input voltage from the AC source to the solar cell panel so that the bypass diode is reverse-biased and to determine malfunction in the solar cell panel body on the basis of a ratio of output voltage measured by the voltage measuring means to the input voltage, and wherein the bypass diode malfunction determination portion is configured to control the AC source to control magnitude of DC voltage to be superimposed on AC voltage and then to apply input voltage from the AC source to the solar cell panel so that the bypass diode is forward-biased and to determine malfunction in the bypass diode on the basis of a ratio of output voltage measured by the voltage measuring means to the input voltage.

(ii) The AC source is provided on the positive side of the solar cell panel body and the voltage measuring means is provided on the negative side of the solar cell panel body, wherein the panel body malfunction determination portion is configured to control the AC source to apply input voltage as AC voltage superimposed on positive DC voltage to the solar cell panel when the solar cell panel is not generating power and to determine malfunction in the solar cell panel body on the basis of a ratio of output voltage measured by the voltage measuring means to the input voltage, and wherein the bypass diode malfunction determination portion is configured to control the AC source to apply input voltage as AC voltage superimposed on negative DC voltage to the solar cell panel when the solar cell panel is not generating power and to determine malfunction in the bypass diode on the basis of a ratio of output voltage measured by the voltage measuring means to the input voltage.

(iii) The malfunction detecting device further comprises:
a switching circuit provided between the AC source and the solar cell panel so as to be switchable whether or not to interpose a capacitor for removing DC component,
wherein the malfunction determination portion is configured to switch the switching circuit to interpose the capacitor when the solar cell panel is generating power and not to interpose the capacitor when the solar cell panel is not generating power, and
wherein the panel body malfunction determination portion is configured to control the AC source to apply input voltage as AC voltage not superimposed on DC voltage to the solar cell panel when the solar cell panel is generating power and to determine malfunction in the solar cell panel body on the basis of a ratio of output voltage measured by the voltage measuring means to the input voltage.

(iv) The malfunction detecting device further comprises:
an alarm means for raising an alarm when malfunction in the solar cell panel body or the bypass diode is detected by the panel body malfunction determination portion or the bypass diode malfunction determination portion.

Points of the Invention

According to one embodiment of the invention, a malfunction detecting device for a solar cell panel is constructed such that by controlling a magnitude of DC voltage to be superimposed at an AC source, an input voltage Vin is applied to a solar cell panel from the AC source to reverse-bias a bypass diode, whereby a malfunction in a solar cell panel body is determined on the basis of an input-output ratio at that time, and by controlling a magnitude of DC voltage to be superimposed at the AC source, an input voltage Vin is applied to the solar cell panel from the AC source to forward-bias the bypass diode, whereby a malfunction in the bypass diode is determined on the basis of an input-output ratio at that time.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiments of the invention will be described below in conjunction with the appended drawings.

Figure 1:
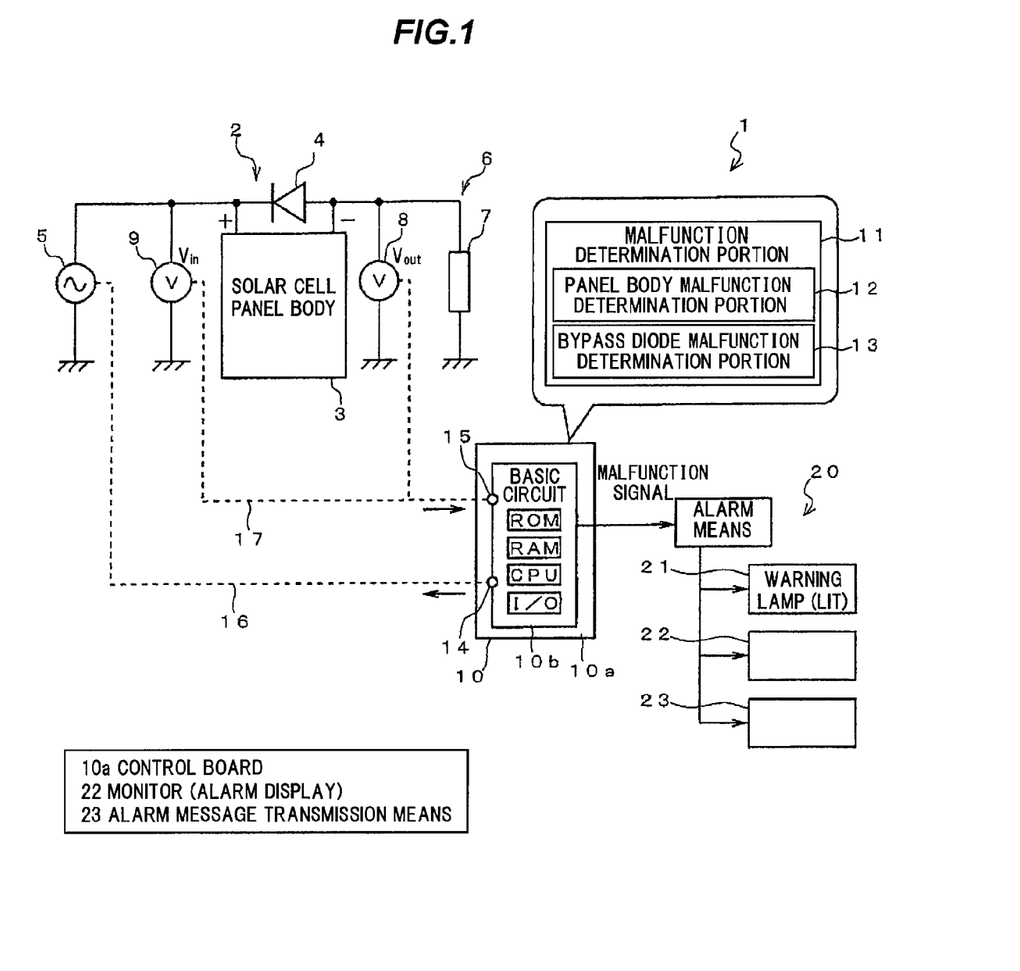
FIG. 1 is a schematic block diagram illustrating a solar cell panel malfunction detecting device in an embodiment of the present invention.

FIG. 1 is a schematic block diagram illustrating a solar cell panel malfunction detecting device in the present embodiment.

As shown in FIG. 1, a solar cell panel malfunction detecting device 1 is to detect malfunction in a solar cell panel 2 and is mainly provided with an AC source 5, a voltage measuring means 6 as a measuring means, a control unit 10 and an alarm means 20.

The solar cell panel 2 has a solar cell panel body 3 and a bypass diode 4 having a cathode electrically connected to a positive terminal of the solar cell panel body 3 and an anode electrically connected to a negative terminal of the solar cell panel body 3. In the drawing, the positive terminal of the solar cell panel body 3 is indicated by a plus symbol (+) and the negative terminal is indicated by a minus symbol (−).

In the solar cell panel malfunction detecting device 1, the AC source 5 is provided on one of positive and negative sides of the solar cell panel body 3 and the voltage measuring means 6 is provided on another side. Here, the case of providing the AC source 5 on the positive side of the solar cell panel body 3 and the voltage measuring means 6 on the negative side of the solar cell panel body 3 will be described.

The AC source 5 which can apply AC voltage superimposed on DC voltage to the solar cell panel 2 is used. In other words, the AC source 5 with a bias function is used.

In addition, it is desirable to use the AC source 5 that frequency of AC voltage output therefrom is variable.

The voltage measuring means 6 is to measure voltage (output voltage) $V_{out}$ output from the solar cell panel 2 and is composed of a sense resistor 7 and an output-side AC voltmeter 8. One end of the sense resistor 7 is electrically connected to the negative terminal of the solar cell panel body 3 and another end is grounded. The output-side AC voltmeter 8 is connected in parallel to sense resistor 7.

In addition, in the solar cell panel malfunction detecting device 1, an input-side AC voltmeter 9 for measuring input voltage $V_{in}$ applied to the solar cell panel 2 from the AC source 5 is provided on the positive side of the solar cell panel body 3.

The control unit 10 has a malfunction determination portion 11 which controls the AC source 5 to control input voltage $V_{in}$ to be applied to the solar cell panel 2 and determines malfunction in the solar cell panel 2 on the basis of a ratio of output voltage $V_{out}$ measured by the voltage measuring means 6 (the output-side AC voltmeter 8) to the input voltage $V_{in}$ (hereinafter, referred to as a input-output ratio). The malfunction determination portion 11 is installed on a basic circuit 10b in a control board 10a of the control unit 10 and is implemented by appropriately combining memory (RAM, ROM), CPU, I/O interface and software, etc.

An output terminal 14 of the control unit 10 is connected to the AC source 5 via a control signal output line 16 so that a signal for controlling voltage (input voltage $V_{in}$) to be applied to the solar cell panel 2 from the AC source 5 can be transmitted from the control unit 10 to the AC source 5.

Meanwhile, an input terminal 15 of the control unit 10 is connected to the output-side AC voltmeter 8 and the input-side AC voltmeter 9 via a control signal input line 17 so that output voltage $V_{out}$ measured by the output-side AC voltmeter 8 and input voltage $V_{in}$ measured by the input-side AC voltmeter 9 are each input to the control unit 10.

The malfunction determination portion 11 is provided with a panel body malfunction determination portion 12 for determining malfunction in the solar cell panel body 3 and a bypass diode malfunction determination portion 13 for determining malfunction in the bypass diode 4.

In the present embodiment, the panel body malfunction determination portion 12 and the bypass diode malfunction determination portion 13 are configured to determine malfunction during the night, etc., when the solar cell panel 2 is not generating power.

Firstly, the panel body malfunction determination portion 12 will be described.

The panel body malfunction determination portion 12 is configured to control the AC 5 source to control magnitude of DC voltage to be superimposed on AC voltage and then to apply input voltage $V_{in}$ from the AC source 5 to the solar cell panel 2 so that the bypass diode 4 is reverse-biased, to calculate an input-output ratio ($V_{out}/V_{in}$) from a ratio of output voltage $V_{out}$ measured by the output-side AC voltmeter 8 to input voltage $V_{in}$ measured by the input-side AC voltmeter 9 and to determine malfunction in the solar cell panel body 3 on the basis of the input-output ratio.

Figure 2A:
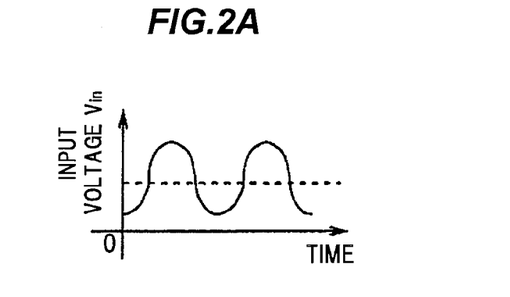
FIG. 2A is a diagram illustrating a waveform of input voltage in the solar cell panel malfunction detecting device in FIG. 1 at the time of determining malfunction in a solar cell panel body and FIG. 2B is a graph showing a relation between frequency of input voltage and an input-output ratio of the solar cell panel body.

In the present embodiment, since the AC source 5 is connected to the positive side of the solar cell panel body 3, input voltage $V_{in}$ which is AC voltage superimposed on positive DC voltage as shown in FIG. 2A is applied to the solar cell panel 2 by the panel body malfunction determination portion 12. DC voltage to be superimposed should be appropriately set so that the entire input voltage $V_{in}$ including AC component is a positive value. Accordingly, the bypass diode 4 is constantly reverse-biased and all electric current thus flow from the positive side toward the negative side by passing through the solar cell panel body 3.

Figure 2B:
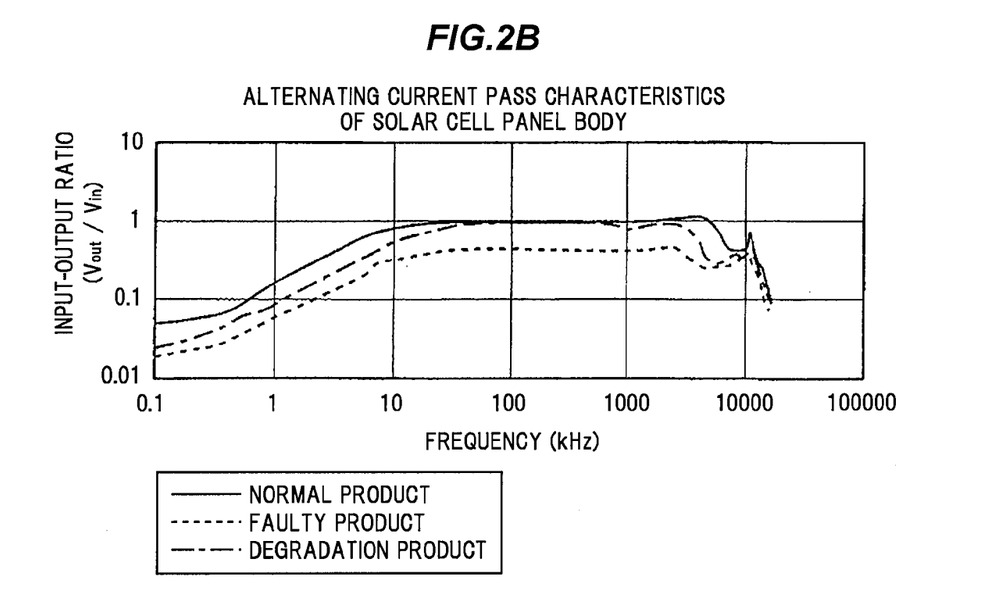

Here, FIG. 2B shows input-output ratios when varying frequency of AV voltage output from the AC source 5 (i.e., alternating current pass characteristics of the solar cell panel body 3). As shown in FIG. 2B, it is understood that an input-output ratio of faulty product (indicated by a dashed line in the drawing) is generally smaller than that of normal product (indicated by a solid line in the drawing). Meanwhile, it is understood that the input-output ratio of degradation product which has not failed but degraded (indicated by a dashed-dotted line in the drawing) is smaller than that of the normal product in a frequency domain of less than 100 kHz.

That is, the input-output ratio is reduced when the solar cell panel body 3 becomes a malfunction state due to failure or degradation. Therefore, in the present embodiment, the panel body malfunction determination portion 12 is configured to determine that malfunction is present in the solar cell panel body 3 when the input-output ratio is below a preset threshold value. However, it is not limited thereto and the panel body malfunction determination portion 12 may be configured to determine that malfunction is present in the solar cell panel body 3 when, e.g., a difference between a measured input-output ratio and an input-output ratio of preliminarily obtained alternating current pass characteristics of the normal product becomes large. Once it is determined that malfunction is present in the solar cell panel body 3, the panel body malfunction determination portion 12 transmits a malfunction signal to the below-described alarm means 20.

In addition, as understood from FIG. 2B, frequency of AC voltage output from the AC source 5 at the time of determining malfunction in the solar cell panel body 3 should be not less than 100 kHz (preferably, not less than 100 kHz and less than 1000 kHz) for determining only failure, and less than 100 kHz (preferably, not less than 1 kHz and less than 10 kHz) for determining both of failure and degradation. In addition, it is possible to distinguish whether it is failure or degradation by determining at a frequency of not less than 100 kHz as well as at a frequency of less than 100 kHz.

Next, the bypass diode malfunction determination portion 13 will be described.

The bypass diode malfunction determination portion 13 is configured to control the AC source 5 to control magnitude of DC voltage to be superimposed on AC voltage and then to apply input voltage $V_{in}$ from the AC source 5 to the solar cell panel 2 so that the bypass diode 4 is forward-biased, to calculate an input-output ratio from a ratio of output voltage $V_{out}$ measured by the output-side AC voltmeter 8 to input voltage $V_{in}$ measured by the input-side AC voltmeter 9 and to determine malfunction in the bypass diode 4 on the basis of the input-output ratio.

Figure 3A:
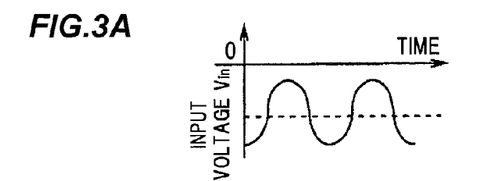
FIG. 3A is a diagram illustrating a waveform of input voltage in the solar cell panel malfunction detecting device in FIG. 1 at the time of determining malfunction in a bypass diode and FIG. 3B is a graph showing a relation between frequency of input voltage and an input-output ratio of the bypass diode.

In the present embodiment, since the AC source 5 is connected to the positive side of the solar cell panel body 3, input voltage $V_{in}$ which is AC voltage superimposed on positive DC voltage as shown in FIG. 3A is applied to the solar cell panel 2 by the bypass diode malfunction determination portion 13. DC voltage to be superimposed should be appropriately set so that the entire input voltage $V_{in}$ including AC component is a negative value. Accordingly, the bypass diode 4 is constantly forward-biased and all electric current thus flow from the negative side to the positive side by passing through the bypass diode 4 with a resistance of substantially zero.

Figure 3B:
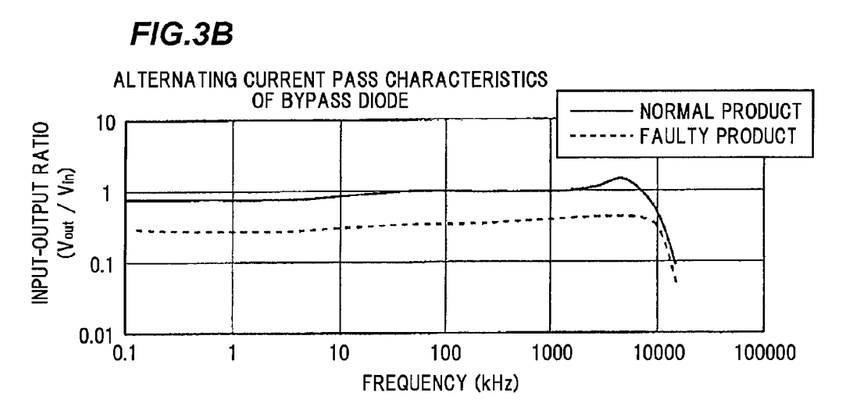

Here, FIG. 3B shows input-output ratios when varying frequency of AV voltage output from the AC source 5 (i.e., alternating current pass characteristics of the bypass diode 4). As shown in FIG. 3B, it is understood that an input-output ratio of faulty product (indicated by a dashed line in the drawing) is generally smaller than that of normal product (indicated by a solid line in the drawing).

That is, the input-output ratio is reduced when the bypass diode 4 breaks down and becomes a malfunction state in the same manner as the solar cell panel body 3. Therefore, in the present embodiment, the bypass diode malfunction determination portion 13 is configured to determine that malfunction is present in the bypass diode 4 when the input-output ratio is below a preset threshold value. However, it is not limited thereto and the bypass diode malfunction determination portion 13 may be configured to determine that malfunction is present in the bypass diode 4 when, e.g., a difference between a measured input-output ratio and an input-output ratio of preliminarily obtained alternating current pass characteristics of the normal product becomes large. Once it is determined that malfunction is present in the bypass diode 4, the bypass diode malfunction determination portion 13 transmits a malfunction signal to the below-described alarm means 20.

In addition, as understood from FIG. 3B, frequency of AC voltage output from the AC source 5 at the time of determining malfunction in the bypass diode 4 should be less than 10000 kHz (preferably, not less than 1 kHz and less than 1000 kHz) and it is desirable to use the same frequency as that used for determining malfunction in the solar cell panel body 3 in order to avoid complexity.

Although the input voltage $V_{in}$ measured by the input-side AC voltmeter 9 and the output voltage $V_{out}$ measured by the output-side AC voltmeter 8 are used to calculate an input-output ratio in the present embodiment, it is not limited thereto and the panel body malfunction determination portion 12 and the bypass diode malfunction determination portion 13 may be configured such that a reading (a reading of $V_{in}$ signal) to be transmitted to the AC source 5 is used in-situ as input voltage $V_{in}$ to calculate an input-output ratio. In this case, it is possible to omit the input-side AC voltmeter 9.

The alarm means 20 is to raise an alarm when the panel body malfunction determination portion 12 or the bypass diode malfunction determination portion 13 detects malfunction in the solar cell panel body 3 or the bypass diode 4.

In the present embodiment, the alarm means 20 is configured to light a warning lamp 21 to inform an administrator that malfunction in the solar cell panel body 3 or the bypass diode 4 is detected when receiving a malfunction signal from the panel body malfunction determination portion 12 or the bypass diode malfunction determination portion 13, and to display the detection of the malfunction in the solar cell panel body 3 or the bypass diode 4 on a monitor 22, and around the same time, to transmit an alarm message to a mobile phone, etc., of the administrator by an alarm message transmission means 23 to notice that malfunction in the solar cell panel body 3 or the bypass diode 4 has been detected.

Next, a control flow for malfunction determination processing in the malfunction determination portion 11 of the solar cell panel malfunction detecting device 1 will be described in conjunction with FIGS. 4 to 6. The malfunction determination processing is performed during the night, etc., when the solar cell panel 2 is not generating power.

A trigger for performing the malfunction determination processing is not specifically limited, and it may be performed when the administrator desires or may be automatically performed at a preset time during the night. Alternatively, it may be performed at predetermined time intervals (e.g., every one hour) within a preset time range during the night.

Figure 4:
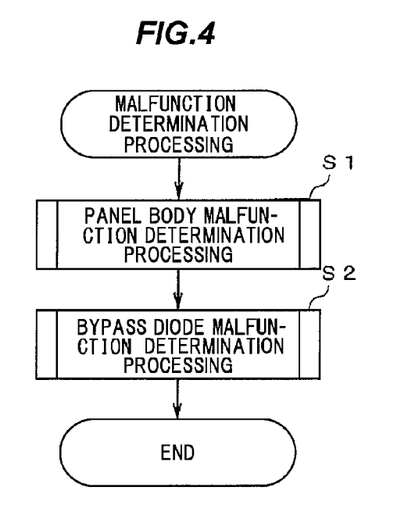
FIG. 4 is a flow chart showing a control flow for malfunction determination processing in a malfunction determination portion of the solar cell panel malfunction detecting device in FIG. 1.

As shown in FIG. 4, in the malfunction determination processing, panel body malfunction determination processing (Step S1) and bypass diode malfunction determination processing (Step S2) are performed and the processing is then ended.

Firstly, the panel body malfunction determination processing (Step S1) will be described.

Figure 5:
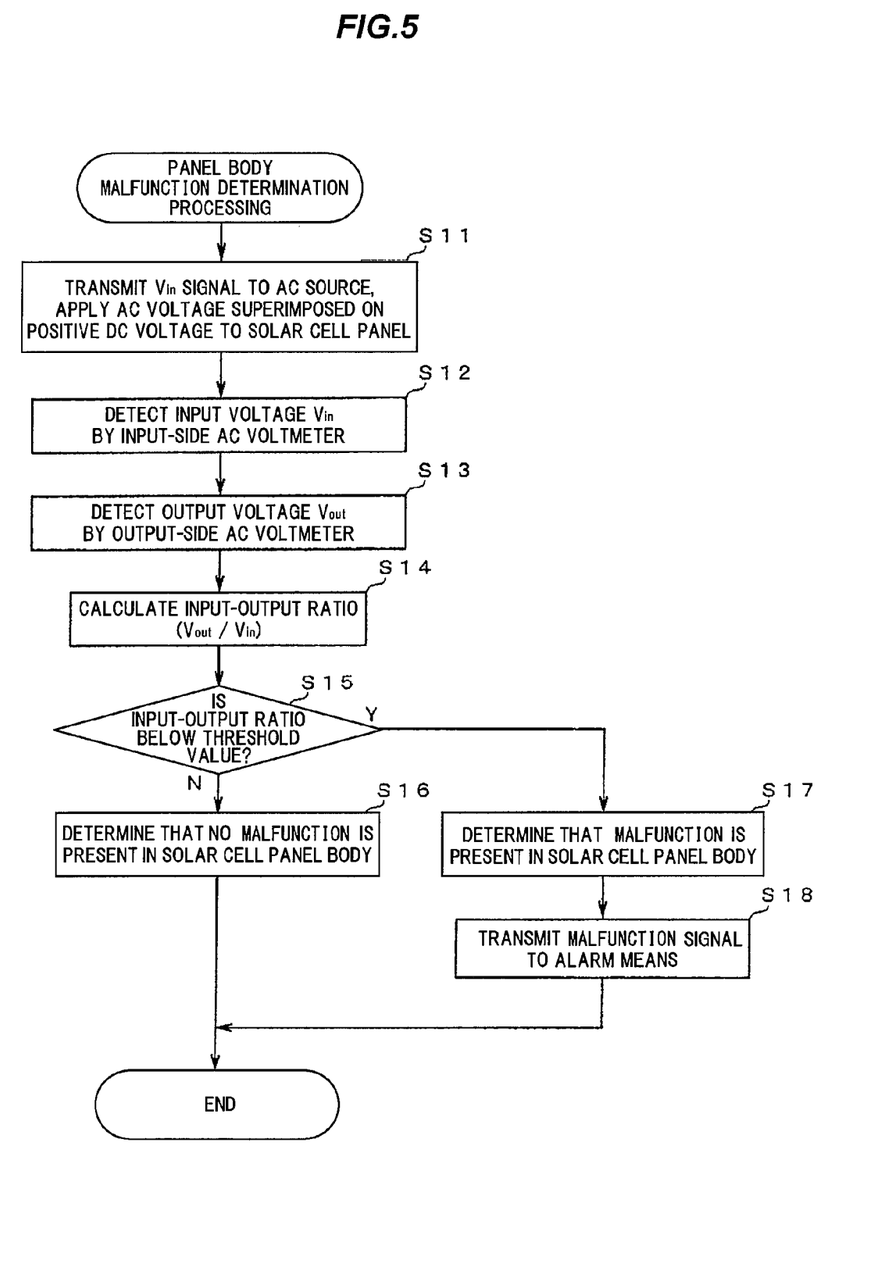
FIG. 5 is a flow chart showing a control flow for panel body malfunction determination processing in the flow chart in FIG. 4.

As shown in FIG. 5, in the panel body malfunction determination processing, the panel body malfunction determination portion 12 transmits a $V_{in}$ signal from the output terminal 14 of the control unit 10 to the AC source 5 and AC voltage superimposed on positive DC voltage is applied to the solar cell panel 2 from the AC source 5 in Step S11.

After that, input voltage $V_{in}$ is detected by the input-side AC voltmeter 9 in Step S12 and output voltage $V_{out}$ is detected by the output-side AC voltmeter 8 in Step S13. The input voltage $V_{in}$ and the output voltage $V_{out}$ which are detected in Steps S12 and S13 are input to the control unit 10 via the input terminal 15.

After detecting the input voltage $V_{in}$ and the output voltage $V_{out}$, the panel body malfunction determination portion 12 calculates an input-output ratio as a ratio of the output voltage $V_{out}$ to the input voltage $V_{in}$ in Step S14 and determines whether or not the calculated input-output ratio is below the preset threshold value in Step S15.

When judgment in Step S15 is NO, the panel body malfunction determination portion 12 determines that no malfunction is present in the solar cell panel body 3 in Step S16 and the processing is ended.

When judgment in Step S15 is YES, the panel body malfunction determination portion 12 determines that malfunction is present in the solar cell panel body 3 in Step S17, a malfunction signal is then transmitted to the alarm means 20 in Step S18, and subsequently, the processing is ended.

Next, the bypass diode malfunction determination processing (Step S2) will be described.

Figure 6:
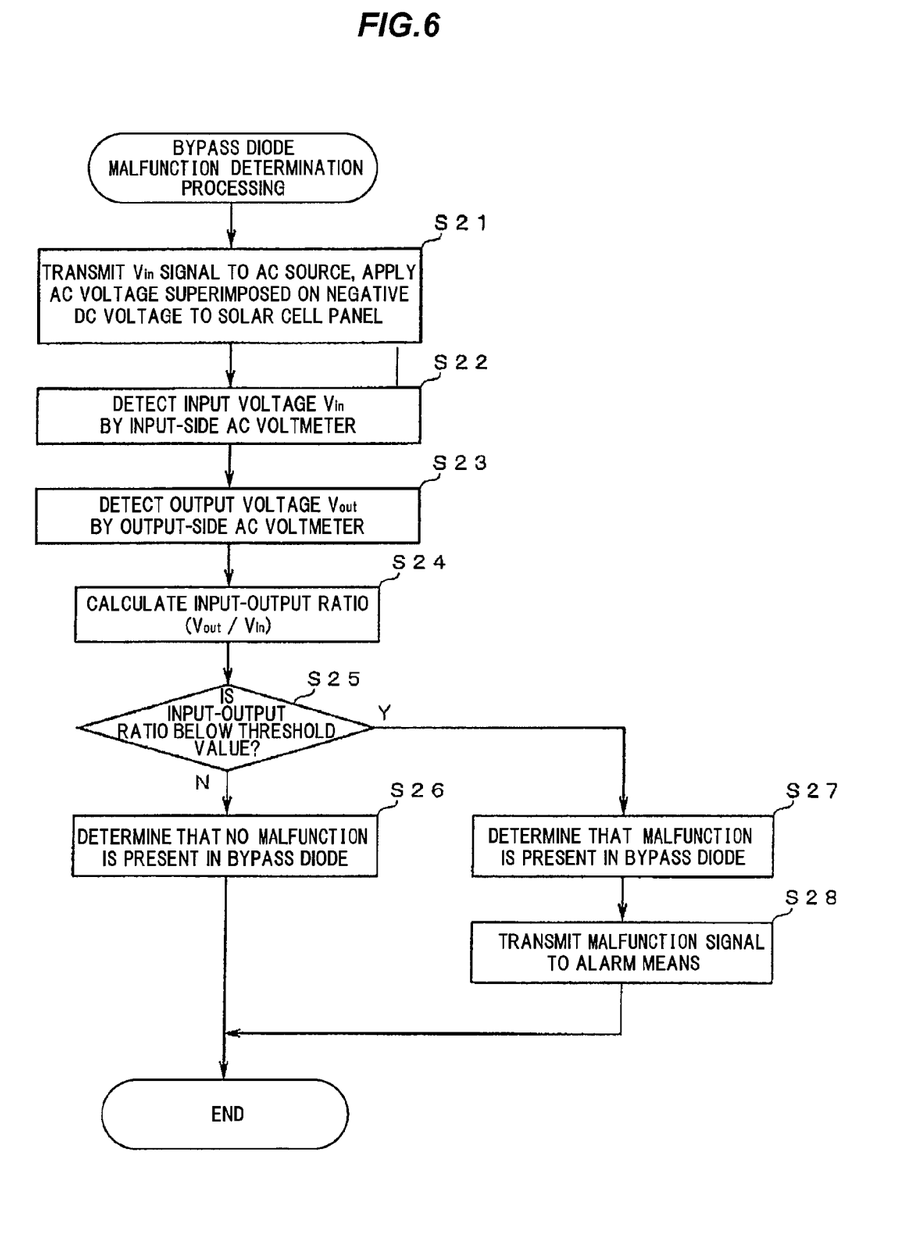
FIG. 6 is a flow chart showing a control flow for bypass diode malfunction determination processing in the flow chart in FIG. 4.

As shown in FIG. 6, in the bypass diode malfunction determination processing, the bypass diode malfunction determination portion 13 transmits a $V_{in}$ signal from the output terminal 14 of the control unit 10 to the AC source 5 and AC voltage superimposed on negative DC voltage is applied to the solar cell panel 2 from the AC source 5 in Step S21.

After that, input voltage $V_{in}$ is detected by the input-side AC voltmeter 9 in Step S22 and output voltage $V_{out}$ is detected by the output-side AC voltmeter 8 in Step S23. The input voltage $V_{in}$ and the output voltage $V_{out}$ which are detected in Steps S22 and S23 are input to the control unit 10 via the input terminal 15.

After detecting the input voltage $V_{in}$ and the output voltage $V_{out}$, the bypass diode malfunction determination portion 13 calculates an input-output ratio as a ratio of the output voltage $V_{out}$ to the input voltage $V_{in}$ in Step S24 and determines whether or not the calculated input-output ratio is below the preset threshold value in Step S25.

When judgment in Step S25 is NO, the bypass diode malfunction determination portion 13 determines that no malfunction is present in the bypass diode 4 in Step S26 and the processing is ended.

When judgment in Step S25 is YES, the bypass diode malfunction determination portion 13 determines that malfunction is present in the bypass diode 4 in Step S27, a malfunction signal is then transmitted to the alarm means 20 in Step S28, and subsequently, the processing is ended.

Effects of the present embodiment will be described.

In the solar cell panel malfunction detecting device 1 of the present embodiment, by controlling a magnitude of DC voltage to be superimposed at AC 5 source, input voltage $V_{in}$ is applied to the solar cell panel 2 from the AC source 5 to reverse-bias the bypass diode 4, whereby a malfunction in the solar cell panel body 3 is determined on the basis of an input-output ratio at that time, and by controlling a magnitude of DC voltage to be superimposed at AC 5 source, input voltage $V_{in}$ is applied to the solar cell panel 2 from the AC source 5 to forward-bias the bypass diode 4, whereby a malfunction in the bypass diode 4 is determined on the basis of an input-output ratio at that time.

As a result, it is possible to realize the solar cell panel malfunction detecting device 1 which can detect malfunction in the solar cell panel body 3 as well as malfunction in the bypass diode 4. By detecting the malfunction in the bypass diode 4, it is possible to prevent failure or fire caused by overheating of the solar cell panel 2.

In addition, since the solar cell panel malfunction detecting device 1 can detect malfunction in both the solar cell panel body 3 and the bypass diode 4 only by switching bias at the AC source 5, a system configuration is simple and malfunction in the bypass diode 4 can be detected easily as compared to the conventional technique in which the bypass diode 4 is inspected manually using a tester, etc.

Although the case of providing the AC source 5 on the positive side of the solar cell panel body 3 and the voltage measuring means 6 on the negative side of the solar cell panel body 3 has been described in the present embodiment, it may be configured to provide the AC source 5 on the negative side of the solar cell panel body 3 and the voltage measuring means 6 on the positive side of the solar cell panel body 3. In this case, it should be configured such that AC voltage is superimposed on negative DC voltage at the AC source 5 for determining malfunction in the solar cell panel body 3 and AC voltage is superimposed on positive DC voltage at the AC source 5 for determining malfunction in the bypass diode 4.

In addition, although a ratio of output voltage to input voltage is used to determine malfunction in the bypass diode 4 in the present embodiment, it is possible to use a ratio of output current to input current or a difference between a phase of AC input value (voltage or current) and a phase of AC output value (voltage or current).

When using, e.g., a ratio of output current to input current, measuring means to be used should be an input-side AC ammeter instead of the input-side AC voltmeter 9 and an output-side AC ammeter instead of the output-side AC voltmeter 8. Meanwhile, when using a difference between a phase of AC input value and a phase of AC output value, a means of calculating a phase of input voltage or input current and a means of calculating a phase of output voltage or output current should be provided.

In other words, the measuring means is not limited to the voltage measuring means 6 as long as the means is to measure voltage or current output from the solar cell panel 2. In addition, the malfunction determination portion 11 should be configured to control the AC source 5 to control input voltage or input current to be input to the solar cell panel 2 and to determine malfunction in the solar cell panel 2 by comparing the input voltage or input current to the output voltage or the output current measured by the measuring means. In this case, the panel body malfunction determination portion 12 reverse-biases the bypass diode 4 by controlling the AC source 5 and determines malfunction in the solar cell panel body 3 on the basis of the input voltage or input current at that time and output voltage or output current measured by the measuring means. Meanwhile, the bypass diode malfunction determination portion 13 forward-biases the bypass diode 4 by controlling the AC source 5 and determines malfunction in the bypass diode 4 on the basis of the input voltage or input current at that time and output voltage or output current measured by the measuring means.

Next, another embodiment of the invention will be described.

Figure 7:
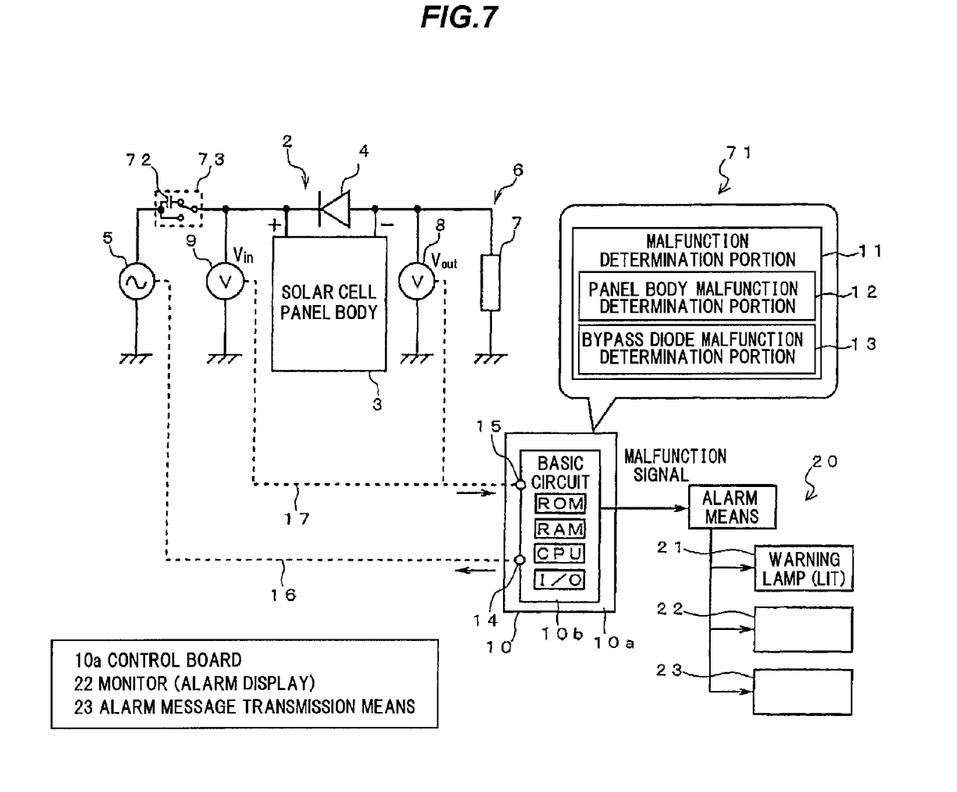
FIG. 7 is a schematic block diagram illustrating a solar cell panel malfunction detecting device in another embodiment of the invention.

A solar cell panel malfunction detecting device 71 shown in FIG. 7 is based on the solar cell panel malfunction detecting device 1 in FIG. 1 and is configured to be able to detect malfunction in the solar cell panel body 3 while the solar cell panel 2 is generating power.

The solar cell panel malfunction detecting device 71 is provided with a switching circuit 73 between the AC source 5 and the solar cell panel 2 so as to be switchable whether or not to interpose a capacitor 72 for removing DC component.

In addition, in the solar cell panel malfunction detecting device 71, the malfunction determination portion 11 is configured to switch the switching circuit 73 to interpose the capacitor 72 when the solar cell panel 2 is generating power and not to interpose the capacitor 72 when the solar cell panel 2 is not generating power.

Furthermore, in the solar cell panel malfunction detecting device 71, the panel body malfunction determination portion 12 is configured to control the AC source 5 to apply AC voltage not superimposed on DC voltage as input voltage $V_{in}$ to the solar cell panel 2 when the solar cell panel 2 is generating power and to determine malfunction in the solar cell panel body 3 on the basis of an input-output ratio as a ratio of the output voltage $V_{out}$ measured by the voltage measuring means 6 to input voltage V. Meanwhile, the bypass diode malfunction determination portion 13 is configured not to operate when the solar cell panel 2 is generating power.

In the solar cell panel malfunction detecting device 71, since the capacitor 72 is interposed between the AC source 5 and the solar cell panel 2 when the solar cell panel 2 is generating power, DC current generated by the solar cell panel 2 is suppressed so as not to flow into the AC source 5. In addition, when only AC voltage is applied by the AC source 5, the applied AC voltage is superimposed on DC voltage generated by the solar cell panel 2 per se and the bypass diode 4 is reverse-biased in the same manner as the above-mentioned case of superimposing AC voltage on positive DC voltage at the AC source 5. Therefore, when an input-output ratio calculated by the panel body malfunction determination portion 12 is below the preset threshold value, it can be determined that malfunction is present in the solar cell panel body 3.

As described above, the solar cell panel malfunction detecting device 71 allows detection of malfunction in the solar cell panel body 3 not only when the solar cell panel 2 is not generating power but also when the solar cell panel 2 is generating power.

It should be noted that the invention is not intended to be limited to the above-mentioned embodiments, and the various kinds of changes can be made without departing from the gist of the invention.

Although the case of detecting malfunction in one solar cell panel 2 has been described as an example in the present embodiment, it is possible to detect malfunction in a solar cell module in which plural solar cell panels 2 are connected in series. In this case, the AC source 5 is provided on one of positive and negative sides of the entire solar cell module and the voltage measuring means 6 is provided on another side. Such configuration allows the panel body malfunction determination portion 12 or the bypass diode malfunction determination portion 13 to determine malfunction in the solar cell panel body 3 or in the bypass diode 4 of any one of the solar cell panels 2 constituting the solar cell module.

In addition, although the case where the input voltage $V_{in}$ and the output voltage $V_{out}$ are measured and an input-output ratio thereof is used to determine malfunction in the solar cell panel body 3 or in the bypass diode 4 has been described in the present embodiment, a current flowing in the solar cell panel 2 may be measured so that malfunction in the solar cell panel body 3 or in the bypass diode 4 is determined on the basis of the value of the electric current (in other words, based on whether or not the value of the electric current is below preset threshold value). In this case, since the direction of the current for detecting malfunction in the solar cell panel body 3 is changed from that for detecting malfunction in the bypass diode 4, it should be configured such that current can be measured in both directions, from the positive side to the negative side and from the negative side to the positive side, by combining an ammeter and CT (Current Transformer).

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A malfunction detecting device for a solar cell panel for detecting a malfunction in the solar cell panel, the solar cell panel comprising a solar cell panel body and a bypass diode having a cathode electrically connected to a positive terminal of the solar cell panel body and an anode electrically connected to a negative terminal of the solar cell panel body, the device comprising:
- an AC source that is provided on one of positive and negative sides of the solar cell panel body and can apply AC voltage superimposed on DC voltage to the solar cell panel;
- a measuring means provided on another of the positive and negative sides of the solar cell panel body to measure voltage or current output from the solar cell panel; and
- a control unit comprising a malfunction determination portion that controls the AC source to control input voltage or input current to be input to the solar cell panel and determines malfunction in the solar cell panel by comparing the input voltage or the input current to output voltage or output current measured by the measuring means,
- wherein the malfunction determination portion comprises:
- a panel body malfunction determination portion controlling the AC source to reverse-bias the bypass diode and determining malfunction in the solar cell panel body on the basis of input voltage or input current at that time and output voltage or output current measured by the measuring means; and
- a bypass diode malfunction determination portion controlling the AC source to forward-bias the bypass diode and determining malfunction in the bypass diode on the basis of input voltage or input current at that time and output voltage or output current measured by the measuring means.

2. The malfunction detecting device according to claim 1, wherein the measuring means comprises a voltage measuring means provided on the other of the positive and negative sides of the solar cell panel body to measure voltage output from the solar cell panel,
- wherein the malfunction determination portion is configured to control the AC source to control input voltage to be applied to the solar cell panel and to determine malfunction in the solar cell panel on the basis of a ratio of output voltage measured by the voltage measuring means to the input voltage,
- wherein the panel body malfunction determination portion is configured to control the AC source to control magnitude of DC voltage to be superimposed on AC voltage and then to apply input voltage from the AC source to the solar cell panel so that the bypass diode is reverse-biased and to determine malfunction in the solar cell panel body on the basis of a ratio of output voltage measured by the voltage measuring means to the input voltage, and
- wherein the bypass diode malfunction determination portion is configured to control the AC source to control magnitude of DC voltage to be superimposed on AC voltage and then to apply input voltage from the AC source to the solar cell panel so that the bypass diode is forward-biased and to determine malfunction in the bypass diode on the basis of a ratio of output voltage measured by the voltage measuring means to the input voltage.

3. The malfunction detecting device according to claim 2, wherein the AC source is provided on the positive side of the solar cell panel body and the voltage measuring means is provided on the negative side of the solar cell panel body,
- wherein the panel body malfunction determination portion is configured to control the AC source to apply input voltage as AC voltage superimposed on positive DC voltage to the solar cell panel when the solar cell panel is not generating power and to determine malfunction in the solar cell panel body on the basis of a ratio of output voltage measured by the voltage measuring means to the input voltage, and
- wherein the bypass diode malfunction determination portion is configured to control the AC source to apply input voltage as AC voltage superimposed on negative DC voltage to the solar cell panel when the solar cell panel is not generating power and to determine malfunction in the bypass diode on the basis of a ratio of output voltage measured by the voltage measuring means to the input voltage.

4. The malfunction detecting device according to claim 3, further comprising:
- a switching circuit provided between the AC source and the solar cell panel so as to be switchable whether or not to interpose a capacitor for removing DC component,
- wherein the malfunction determination portion is configured to switch the switching circuit to interpose the capacitor when the solar cell panel is generating power and not to interpose the capacitor when the solar cell panel is not generating power, and
- wherein the panel body malfunction determination portion is configured to control the AC source to apply input voltage as AC voltage not superimposed on DC voltage to the solar cell panel when the solar cell panel is generating power and to determine malfunction in the solar cell panel body on the basis of a ratio of output voltage measured by the voltage measuring means to the input voltage.

5. The malfunction detecting device according to claim 1, further comprising:
- an alarm means for raising an alarm when malfunction in the solar cell panel body or the bypass diode is detected by the panel body malfunction determination portion or the bypass diode malfunction determination portion.

* * * * *